US007129923B2

United States Patent
Lu

(10) Patent No.: US 7,129,923 B2
(45) Date of Patent: Oct. 31, 2006

(54) ACTIVE MATRIX DISPLAY DEVICE

(75) Inventor: Rung-Nan Lu, Tainan County (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 462 days.

(21) Appl. No.: 10/607,477

(22) Filed: Jun. 25, 2003

(65) Prior Publication Data

US 2004/0263460 A1 Dec. 30, 2004

(51) Int. Cl.
G09G 3/36 (2006.01)
G01R 31/08 (2006.01)
G01R 15/00 (2006.01)
G02F 1/1333 (2006.01)

(52) U.S. Cl. .................... 345/92; 345/98; 345/100; 345/206; 324/527; 324/770; 349/54; 349/139; 349/152; 349/912; 702/57; 702/58; 702/59; 702/118

(58) Field of Classification Search ............. 345/92, 345/98, 100, 904; 349/54, 192, 139, 152; 324/527, 770; 702/57–59, 118
See application file for complete search history.

(56) References Cited

U.S. PATENT DOCUMENTS 6,100,865 A * 8/2000 Sasaki .................... 345/92
6,624,857 B1 * 9/2003 Nagata et al. ............ 349/54
6,784,862 B1 * 8/2004 Kodate et al. ............ 345/92
6,794,892 B1 * 9/2004 Matsueda .................. 324/770
6,839,121 B1 * 1/2005 Kim et al. ................. 349/152
6,853,364 B1 * 2/2005 Kai et al. .................. 345/100
6,864,869 B1 * 3/2005 Udo et al. ................. 345/89
6,924,875 B1 * 8/2005 Tomita ...................... 349/192
2001/0030635 A1 10/2001 Kodate et al. ............. 345/87

* cited by examiner

Primary Examiner—Henry N. Tran
(74) Attorney, Agent, or Firm—Ladas & Parry LLP

(57) ABSTRACT

An active matrix display device having a display region consisting of sub-pixels arrayed in a matrix fashion, the sub-pixels having switching elements, comprising a plurality of data and scan signal lines, and common voltage lines for sending signals and a reference voltage to the sub-pixels, test transistors, each of which is connected to one of the plurality of scan signal lines for sending test signals thereto, and a plurality of input terminals, each of which is connected to one of a plurality of the test transistors, wherein each gate of the test transistors and each of the common voltage lines are connected to one of the input terminals, the test transistors control inputs of the test signals to the sub-pixels.

23 Claims, 5 Drawing Sheets

ACTIVE MATRIX DISPLAY DEVICE

BACKGROUND OF THE INVENTION

1. Field of the Invention

The present invention relates to an LCD circuit and particularly to an active matrix display device using the gate-to-gate signal for light-on test as the common voltage supplied to the storage capacitor.

2. Description of the Prior Art

Liquid crystal displays (LCD) have in recent years been substituted for CRTs (Cathode Ray Tubes) as display units. This is mainly because LCDs provide the advantage of occupying less area than CRTs because LCDs are flat display units. Therefore, LCDs require less space and the demand for LCDs as portable and household displays has increased dramatically.

Moreover, LCDs provide the advantage consuming less power than CRTs. In particular, an active-matrix liquid crystal display that mounts an active element for each picture element of a liquid crystal display panel is noteworthy because it provides a display quality equal to that of a CRT.

FIGS. 1 and 2 are a typical schematic and a sectional view showing the structure of an existing TFT-LCD. First, the structure of the existing TFT-LCD is described below by referring to FIG. 1. The TFT-LCD comprising an array substrate 12 on which pixel electrodes 10 are formed in a matrix and a facing substrate 14 arranged so as to face the array substrate surface at a predetermined interval. A TFT 16 serving as a switching element is formed near the pixel electrodes 10 on the array substrate 12 of the TFT-LCD respectively and source electrodes 18 of these TFTs are connected to the pixel electrodes 10. A gate electrode 20 and a drain electrode 22 of a TFT are connected to the scan signal line 24 and data signal line 26 constituting a row and a column of a matrix respectively. The scan signal lines 24 and the data signal lines 26 are formed at predetermined intervals and they are all perpendicular to each other. Moreover, each pixel electrode 10 has a necessary capacitance between the pixel electrode 10 and the storage capacitance line 28. This capacitance serves as a storage capacitance 29.

As shown in FIG. 2, an existing TFT-LCD has a structure in which an undercoat layer 42, a gate electrode 20 (scan signal line 24), a pixel electrode 10, a gate insulating film 44, a semiconductor layer (channel layer) 46, a channel protective film 48, an ohmic contact layer 50, a passivation film 52, and an alignment film 54 are deposited on an array substrate 12. Among these layers and films, the undercoat layer 42, channel protective layer 48, passivation film 52, and alignment film 54 may not be deposited. A common electrode 30 is formed at the facing substrate 14 side of the TFT-LCD corresponding to an area in which pixel electrodes 10 on the array substrate 12 are arranged in a matrix. I16ut signals are supplied to an OLB (Outer Lead Bonding) electrode 60 extended from a pixel area in which the pixel electrode 10 on the array substrate 12 is formed up to the perimeter of the area. Among the potentials of these signals, the potential of the common electrode 30 on the facing substrate is supplied from a plurality of portions of electrodes on the array substrate through a transfer 62 using conductive paste at the outside of the pixel area. The common electrode 30 is made of a transparent material such as ITO (Indium Tin Oxide) because it is necessary to pass light through the electrode 30. However, because the material has a large electrical resistance, the electrical resistance from a potential supply terminal to the central portion of a display screen increases as a display unit increases in size. Moreover, in the case of a color-display TFT-LCD, a color filter 32 consisting of three primary colors of red (R), green (G), and blue (B) is formed in a matrix between the facing substrate 14 and the common electrode 30 corresponding to the pixel electrode 10 of the array substrate 12. Furthermore, a black matrix 66 is formed like a lattice. In the case of an existing liquid crystal display, transparent spherical spacers 36 are scattered in a liquid crystal layer 34 held by the array substrate 12 and the facing substrate 14 in order to keep a predetermined interval between the two substrates 12 and 14. Moreover, liquid crystal is sealed between the two substrates by a sealant 64. Furthermore, a polarizing film 38 is frequently set at the outer laterals of the array substrate 12 and the facing substrate 14. Furthermore, a direct-view transmission-type TFT-LCD has a backlight 68 and an image is output by controlling the transmittance of an incident light 69 emitted from the backlight 68.

The finished liquid crystal displays must be tested for quality assurance before leaving the factory. The light-on test is one of the quality tests that should be carried out. Test transistors equal to the number of rows of pixels are formed next to the pixel array and used as switches for the light-on test, as shown in FIG. 3. During the light-on test, a gate-to-gate signal LCDQ1 is raised to a high logic voltage level to turn on the test transistors NL1~NL4, by which gate signals LCDQ2 are transferred through scan signal lines 24 to the gates of the switching transistors 16. Thus, all the switching transistors 16 in the pixel array PA are turned on. In the mean time, data signals DS are provided through data signal lines 26 to illuminate all the pixels. After the light-on test, the gate-to-gate signal LCDQ1 is pulled down to a low logic voltage level to isolate the signals LCDQ2 from the scan signal lines 24.

As shown in FIG. 3, a conducting line CL is also formed next to the pixel array PA to supply a common voltage Vcom to the storage capacitors 29. The conducting line CL must be bold enough to conduct a large current to or from the large number of pixels. There may be also some other elements formed next to the pixel array PA, such as ESD protection devices or patterns for alignment during the process. However, the width of the margin area next to the pixel array PA in the present LCDs may be smaller than 4 cm. Dividing the limited space provided for the bold conducting lines CL and LL presents a problem.

SUMMARY OF THE INVENTION

The object of the present invention is to provide an active matrix display device using the gate-to-gate signal for light-on test as the common voltage supplied to the storage capacitor.

The present invention provides An active matrix display device having a display region consisting of sub-pixels arrayed in a matrix fashion, the sub-pixels having switching elements, comprising a plurality of data and scan signal lines, and common voltage lines for sending signals and a reference voltage to the sub-pixels, test transistors, each of which is connected to one of the plurality of scan signal lines for sending test signals thereto, and a plurality of input terminals, each of which is connected to one of a plurality of the test transistors, wherein each gate of the test transistors and each of the common voltage lines are connected to one of the input terminals, the test transistors control inputs of the test signals to the sub-pixels.

The present invention also provides a liquid crystal display panel comprising an array substrate on which an active matrix display device is formed, wherein the active matrix display device comprises a plurality of data and scan signal lines, and common voltage lines for sending signals and a reference voltage to the sub-pixels, test transistors, each of which is connected to one of the plurality of scan signal lines for sending test signals thereto, and a plurality of input terminals, each of which is connected to one of a plurality of the test transistors, wherein each gate of the test transistors and each of the common voltage lines are connected to one of the input terminals, the test transistors control inputs of the test signals to the sub-pixels, a facing substrate having a common electrode, and a liquid crystal sealed between the array and facing substrate.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
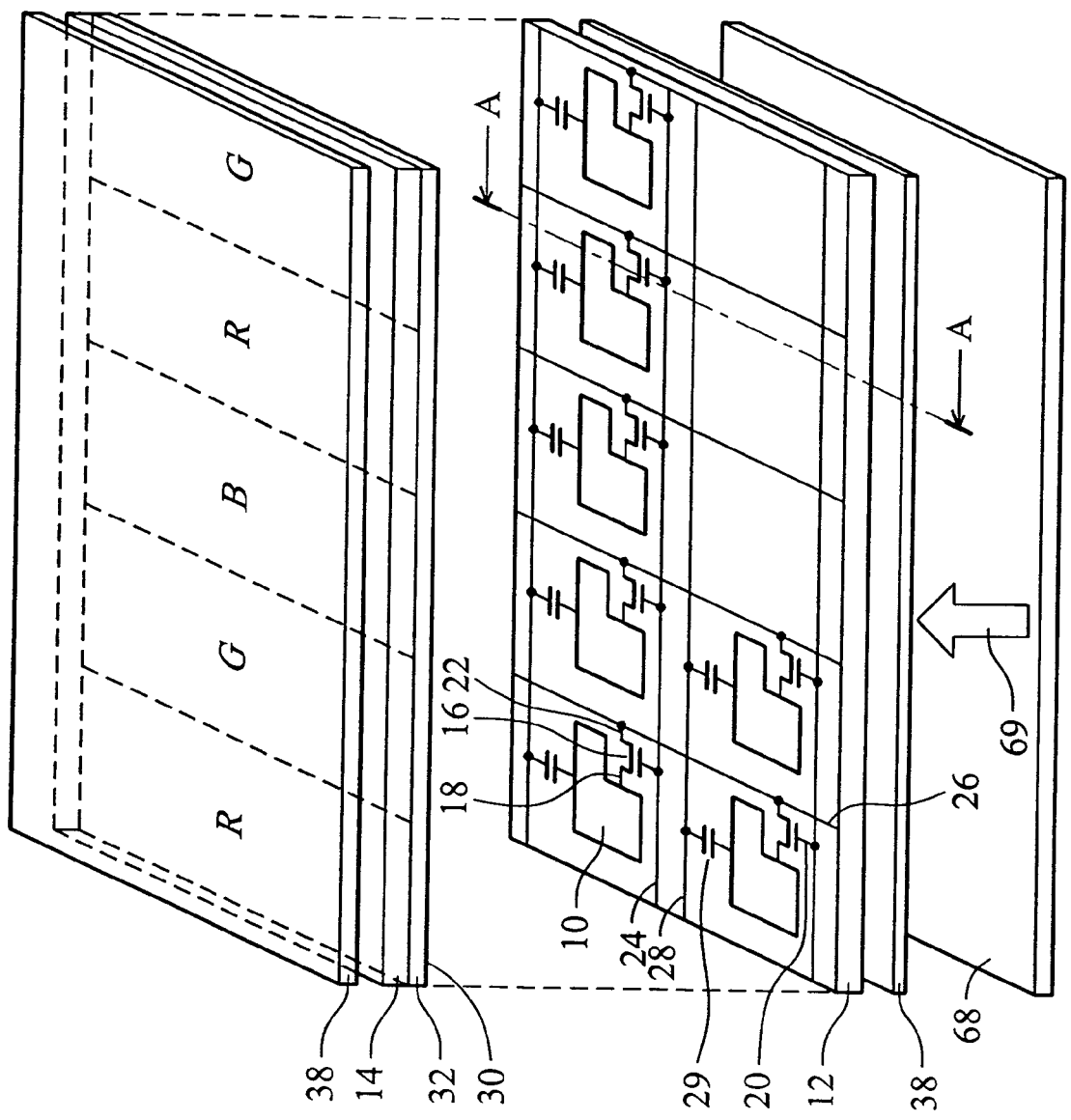
FIG. 1 is a perspective view of the structure of a TFT-LCD.
Figure 2:
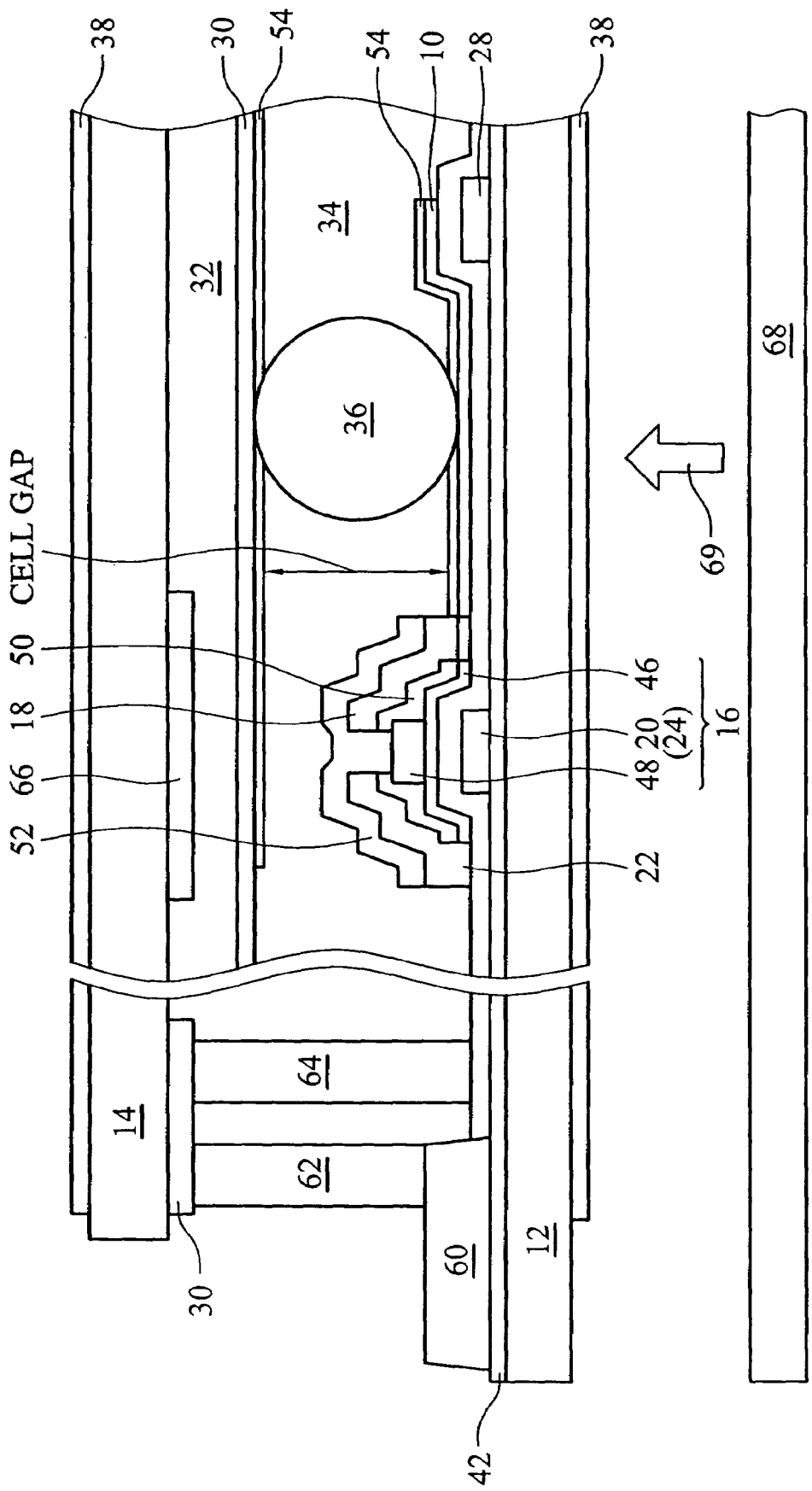
FIG. 2 is a sectional view of the structure of the TFT-LCD, taken along the line AA of FIG. 1.
Figure 4:
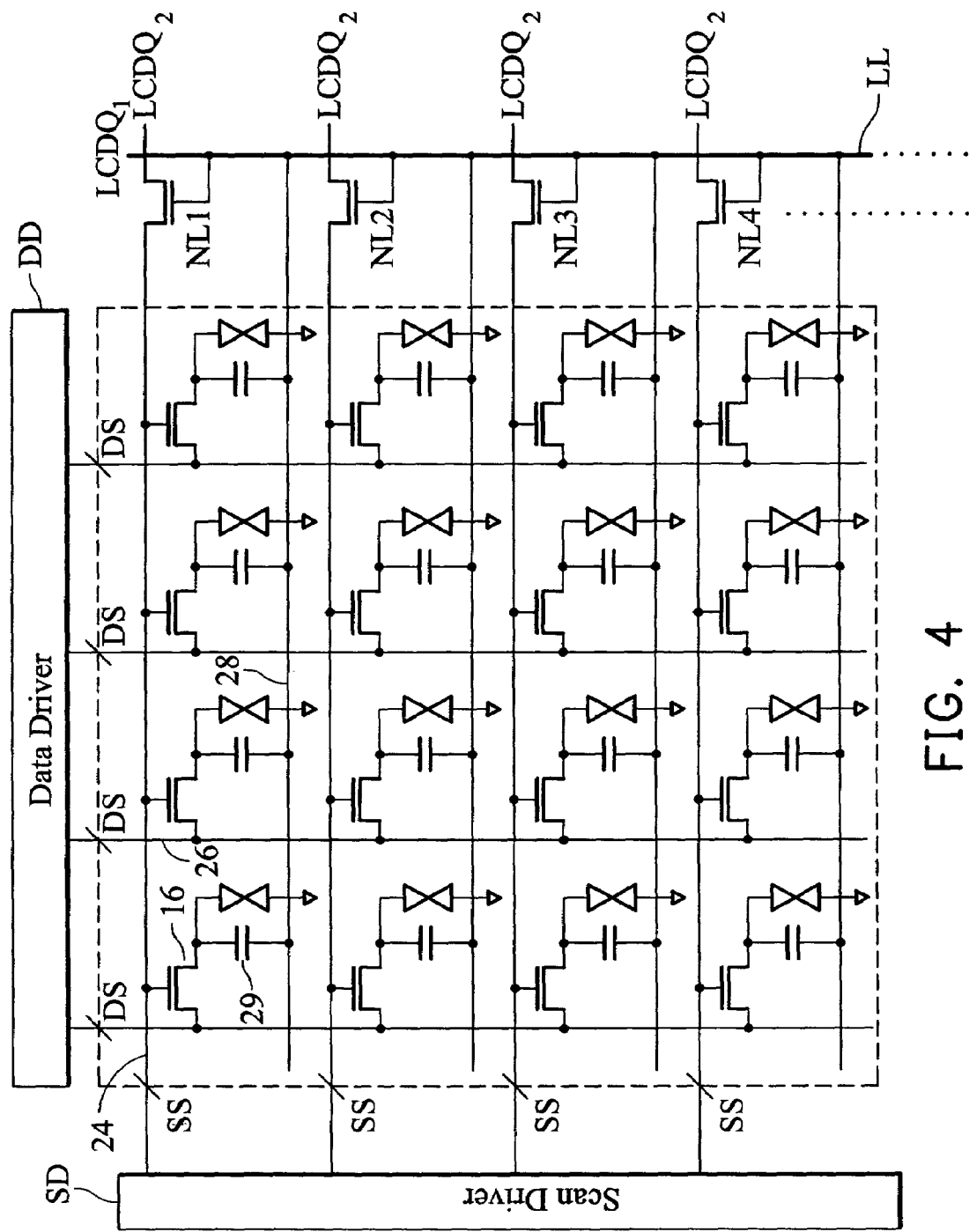
FIG. 4 is a schematic diagram showing an LCD circuit according to one embodiment of the invention.

Referring to FIGS. 1, 2, and 4, the structure of a TFT-LCD is shown according to one embodiment of the invention, wherein some sub-pixels of a display region indicated by dashed lines in FIG. 4 are exemplified by those shown in FIG. 1. As shown in FIG. 1, the TFT-LCD includes an array substrate 12 on which pixel electrodes 10 are formed in a matrix and a facing substrate 14 arranged so as to face the array substrate surface at a predetermined interval. A TFT 16 serving as a switching element is formed near the pixel electrodes 10 on the array substrate 12 of the TFT-LCD respectively and source electrodes 18 of these TFTs are connected to the pixel electrodes 10. A gate electrode 20 and a drain electrode 22 of a TFT are connected to the scan signal line 24 and data signal line 26 for receiving scan signals SS and data signals DS from the scan driver SD and data driver DD constituting a row and a column of a matrix respectively. The scan signal lines 24 and the data signal lines 26 are formed at predetermined intervals and they are all perpendicular to each other. Moreover, each pixel electrode 10 has a necessary capacitance between the pixel electrode 10 and the storage capacitance line 28. This capacitance serves as a storage capacitance 29.

As shown in FIG. 2, an existing TFT-LCD has a structure in which an undercoat layer 42, a gate electrode 20 (scan signal line 24), a pixel electrode 10, a gate insulating film 44, a semiconductor layer (channel layer) 46, a channel protective film 48, an ohmic contact layer 50, a passivation film 52, and an alignment film 54 are deposited on an array substrate 12. Among these layers and films, the undercoat layer 42, channel protective layer 48, passivation film 52, and alignment film 54 may not be deposited. A common electrode 30 is formed at the facing substrate 14 side of the TFT-LCD corresponding to an area in which pixel electrodes 10 on the array substrate 12 are arranged in a matrix. Input signals are supplied to an OLB (Outer Lead Bonding) electrode 60 extended from a pixel area in which the pixel electrode 10 on the array substrate 12 is formed up to the perimeter of the area. Among the potentials of these signals, the potential of the common electrode 30 on the facing substrate is supplied from a plurality of portions of electrodes on the array substrate through a transfer 62 using conductive paste at the outside of the pixel area. The common electrode 30 is made of a transparent material such as ITO (Indium Tin Oxide) because it is necessary to pass light through the electrode 30. However, because the material has a large electrical resistance, the electrical resistance from a potential supply terminal to the central portion of a display screen increases as a display unit increases in size. Moreover, in the case of a color-display TFT-LCD, a color filter 32 consisting of three primary colors of red (R), green (G), and blue (B) is formed in a matrix between the facing substrate 14 and the common electrode 30 corresponding to the pixel electrode 10 of the array substrate 12. Furthermore, a black matrix 66 is formed like a lattice. In the case of an existing liquid crystal display, transparent spherical spacers 36 are scattered in a liquid crystal layer 34 held by the array substrate 12 and the facing substrate 14 in order to keep a predetermined interval between the two substrates 12 and 14. Moreover, liquid crystal is sealed between the two substrates by a sealant 64. Furthermore, a polarizing film 38 is frequently set at the outer laterals of the array substrate 12 and the facing substrate 14. Furthermore, a direct-view transmission-type TFT-LCD has a backlight 68 and an image is output by controlling the transmittance of an incident light 69 emitted from the backlight 68.

FIG. 4 shows the LCD circuit on the array substrate 12. In addition to scan signal lines, data signal lines, storage capacitance lines (or called common voltage lines), and switching elements to form sub-pixels of the display device, an active matrix display device according to the invention, such as the TFT-LCD shown in this embodiment, includes test switches which are coupled to the scan signal lines and whose control terminals are coupled to the common voltage lines. When indicating enabling test switches, e.g. a high logic voltage level, the reference voltage can be applied to the control terminals to enable the test switches for transferring test signals applied to the test switches through the scan signal lines to the sub-pixels so as to perform a test of the display device. Conversely, when indicating disabling test switches, e.g. a low logic voltage level, the reference voltage can be applied to the control terminals to disable the test switches while the reference voltage serves as a common voltage to be supplied on the common voltage lines, that is, the storage capacitance lines, so as to enable storage capacitance to be formed within the sub-pixels. In FIG. 4, test transistors NL1~NL4 equal to the number of rows of pixels are formed next to the pixel array PA on the array substrate 12 and used as test switches for the light-on test. The test transistors NL1~NL4 have drains/sources coupled to the scan signal lines 24, sources/drains coupled to receive a LCDQ2 signal and gates coupled to receive a LCDQ1 signal. The test transistors NL1~NL4 are turned on by the signal LCDQ1 so that the signals LCDQ2 are transmitted on the scan signal lines 24 to illuminate the pixels during the light-on test. The transistors NL1-NL4 are turned off by the signal LCDQ1 so that the signals LCDQ2 isolated from the scan signal lines 24 and the signal LCDQ1 is used as the common voltage Vcom supplied to the storage capacitors 29 in the pixels through the storage capacitance lines 28 beyond the light-on test.

Figure 3:
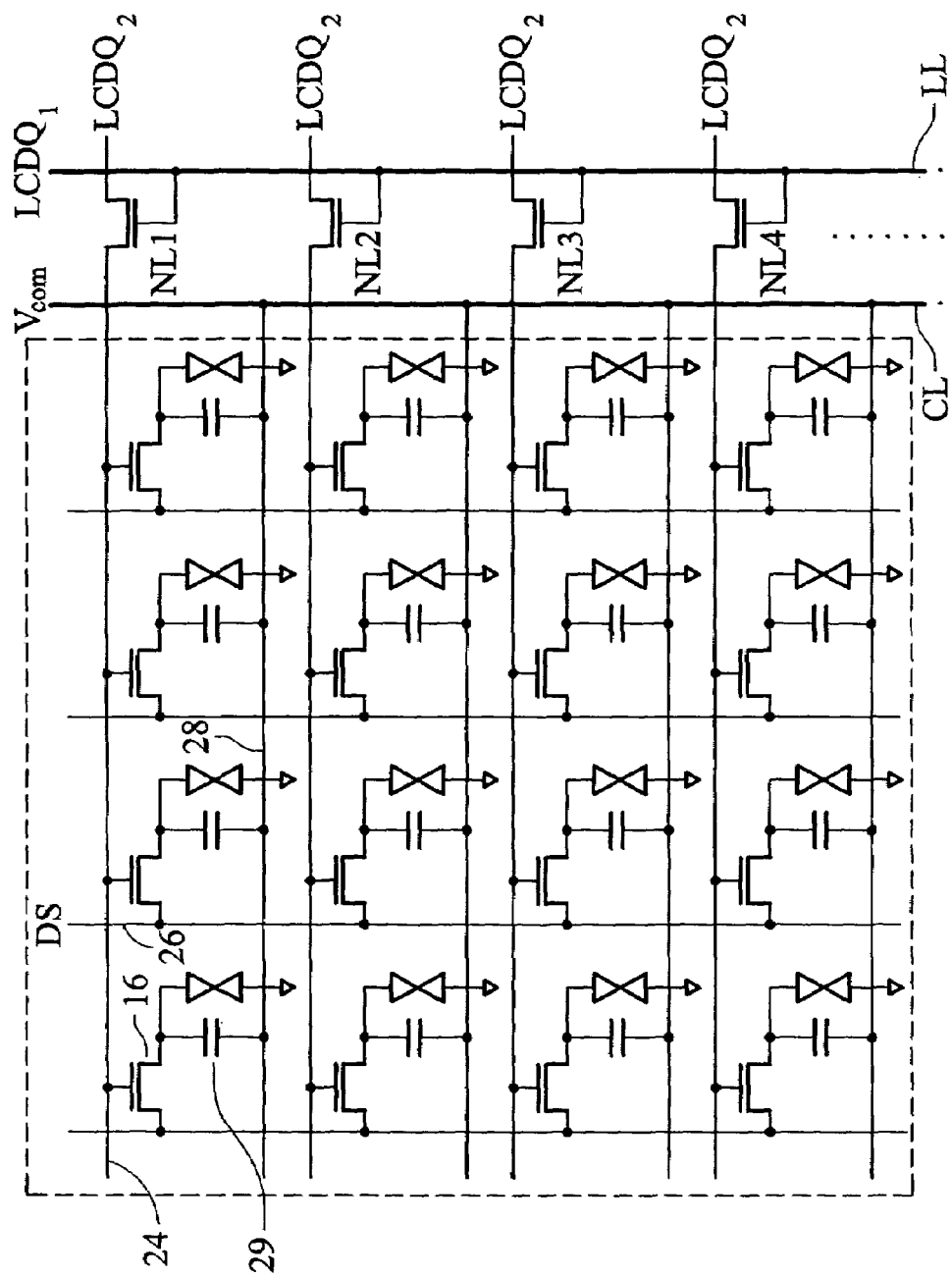
FIG. 3 is a schematic diagram showing a conventional LCD circuit.

By comparing the LCD circuits shown in FIGS. 3 and 4, it is noted that the circuit in FIG. 4 has only one conducting line formed next to the pixel array PA. The low logic voltage level of the signal LCDQ1 beyond the light-on test is used as the common voltage Vcom.

Figure 5:
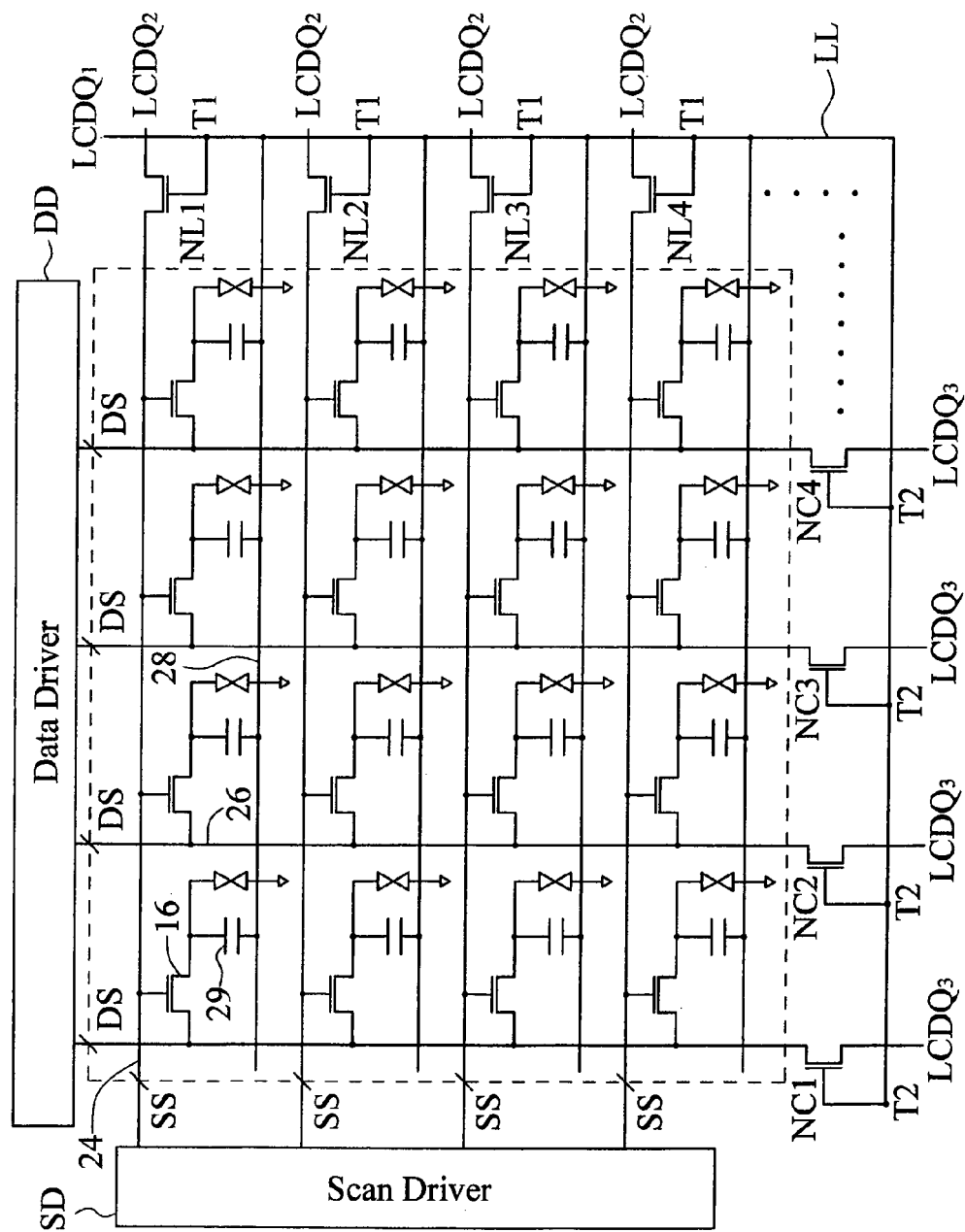
FIG. 5 is a schematic diagram showing an LCD circuit according to another embodiment of the invention.

Alternatively, the test transistors NL1~NL4 may have drains/sources coupled to the data signal lines 26 instead of the scan signal lines 24, or, in addition to the test transistors NL1~NL4, there may be test transistors having drains/sources coupled to the data signal lines 26. As exemplified in FIG. 5, in addition to the first group of test transistors NL1 to NL4, a second group of test transistors NC1 to NC4 are coupled to the data signal lines, and their control terminals, that is, gates of the test transistors NC1 to NC4, are coupled to the common voltage lines. In FIG. 5, a gate of one of the test transistor NL1 of the first group of test transistors and a corresponding common voltage line 28 are connected to a first input terminal, denoted by T1, while a gate of one of the test transistor NC1 of the second group of test transistors and a corresponding common voltage line 28 are connected to a second input terminal, denoted by T2. In FIG. 5, all of these first input terminals T1 corresponding to the test transistors NL1 to NL4 are connected to a conducting line LL. All of these second input terminals corresponding to the test transistors NC1 to NC4 are connected to the conducting line LL, for example. One of the second group of test transistor, for example NC1, when enabled through its second input terminal T2, causes a second test signal, denoted by LCDQ3, to feed to a corresponding data signal line DS. According to FIG. 4 or 5, the display region indicated by dashed lines in FIG. 4 or 5 includes a plurality of pixels or sub-pixels and can be regarded as being composed of a plurality of blocks. Each of the blocks, or called a sub-pixel section, corresponds to some test transistors, such as NL1 to NL4, and corresponds to a set of input terminals, such as the input terminals T1 corresponding to NL1 to NL4. Further, this circuit configuration is suitable for a normally white pixel array. The common voltage is provided by the LCDQ signal which is different from the voltage on the common electrode of the facing substrate. By shorting the switching transistor to the common voltage line to bypass the storage capacitor, the voltage difference between the common electrodes of the array and facing substrate turns a defect pixel to a dark pixel. Thus, there is no white pixel even if there are defects in a normally white pixel array.

In conclusion, in the present invention, the storage capacitance lines of the pixels are directly coupled to the conducting line for the signal LCDQ1. The low logic voltage level of the signal LCDQ1 beyond the light-on test is used as the common voltage supplied to the storage capacitor. There is only one bold conducting line formed in the limited margin area next to the pixel array. This eliminates the layout problem in the conventional LCD circuit.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An active matrix display device having a display region consisting of sub-pixels arrayed in a matrix fashion, the sub-pixels having switching elements, comprising:
   a plurality of data signal lines for sending data signals to the sub-pixels;
   a plurality of scan signal lines for sending scan signals to the sub-pixels;
   a plurality of common voltage lines for sending a reference voltage to the sub-pixels;
   first test transistors, each of which is connected to one of the plurality of scan signal lines for sending first test signals thereto; and
   a plurality of first input terminals, each of which is connected to one of a plurality of the first test transistors;
   wherein each gate of the first test transistors and each of the common voltage lines are connected to one of the first input terminals, the first test transistors control inputs of the first test signals to the sub-pixels.

2. The device as claimed in claim 1, wherein each of the sub-pixels comprises:
   a switching transistor having a gate coupled to one of the scan signal lines, a drain/source coupled to one of the data signal lines; and
   a storage capacitor formed between one of the common voltage lines and a source/drain of the switching transistor.

3. The device as claimed in claim 1 further comprising:
   a data driver generating the data signals; and
   a scan driver generating the scan signals.

4. The device as claimed in claim 1 further comprising:
   second test transistors, each of which is connected to one of the plurality of the data signal lines for sending second test signals thereto; and
   a plurality of second input terminals, each of the second input terminals is connected to one of a plurality of the second test transistors;
   wherein each gate of the second test transistors and each of the common voltage lines are connected to one of the second input terminals, the second test transistors control inputs of the second test signals to the sub-pixels.

5. A liquid crystal display panel comprising:
   an array substrate on which an active matrix display device is formed, wherein the active matrix display device comprises:
   a plurality of data signal lines for sending data signals to the sub-pixels;
   a plurality of scan signal lines for sending scan signals to the sub-pixels;
   a plurality of common voltage lines for sending a reference voltage to the sub-pixels;
   test transistors, each of which is connected to one of the plurality of scan signal lines for sending test signals thereto; and
   a plurality of input terminals, each of which is connected to one of a plurality of the test transistors;
   wherein each gate of the test transistors and each of the common voltage lines are connected to one of the input terminals, the test transistors control inputs of the test signals to the sub-pixels;
   a facing substrate having a common electrode; and
   a liquid crystal sealed between the array and facing substrate.

6. The panel as claimed in claim 5, wherein each of the sub-pixels further comprises:
a switching transistor having a gate coupled to one of the scan signal lines, a drain/source coupled to one of the data signal lines; and
a storage capacitor formed between one of the common voltage lines and a source/drain of the switching transistor.

7. The panel as claimed in claim 5, wherein the active matrix display device further comprises:
a data driver generating the data signals; and
a scan driver generating the scan signals.

8. An active matrix display device having a display region consisting of sub-pixels arrayed in a matrix fashion, the sub-pixels having switching elements, comprising:
a plurality of data signal lines for sending data signals to the sub-pixels;
a plurality of scan signal lines for sending scan signals to the sub-pixels;
a plurality of common voltage lines for sending a reference voltage to the sub-pixels;
test transistors, each of which is connected to one of the plurality of scan signal lines for sending test signals thereto; and
a plurality of input terminals, each of which is connected to one of a plurality of the test transistors;
wherein each gate of the test transistors and each of the common voltage lines are connected to one of the input terminals, the test transistors control inputs of the test signals to the sub-pixels, the display region is composed of a plurality of blocks, the scan signal lines included in a first block of the plurality of blocks are connected to a first set of the input terminals via sources/drains of the test transistors, and the scan signal lines included in a second block of the plurality of blocks are connected to a second set of the input terminals different from the first set of the input terminals via the sources/drains of the test transistors.

9. An active matrix display device comprising:
an array substrate having sub pixel sections arrayed in a matrix fashion, each sub pixel section having a switching element, the array substrate including:
a plurality of data signal lines for sending data signals to the sub pixel sections;
a plurality of scan signal lines for sending scan signals to the sub pixel sections;
a plurality of common voltage lines for sending a reference voltage to the sub pixel sections;
test transistors, each of which is connected to one of the plurality of scan signal lines for sending test signals thereto; and
a plurality of input terminals for inputting the test signals;
wherein drains or sources of the test transistors are connected to the scan signal lines, gates of a plurality of the test transistors and the common voltage lines are connected to a first input terminal of the plurality of input terminals, the sources or drains of a plurality of the test transistors are connected to a second input terminal of the plurality of input terminals, and the test transistors control inputting of the test signals to the sub pixel sections.

10. The active matrix display device as claimed in claim 9, wherein the switching elements of the sub pixel sections and the test transistors are thin film transistors formed of amorphous silicon.

11. The active matrix display device as claimed in claim 9, further comprising an opposing substrate opposite to the array substrate.

12. The active matrix display device as claimed in claim 9, wherein the sources or drains of the test transistors that are connected to adjacent ones of the scan signal lines are connected to different ones of the plurality of input terminals.

13. The active matrix display device as claimed in claim 9, wherein the gates of all of the test transistors connected to the scan signal lines on the array substrate are connected to the first input terminal.

14. The active matrix display device as claimed in claim 9, further comprising: a drive circuit connected to the plurality of data signal lines and the plurality of scan signal lines, wherein when the drive circuit controls inputting of a screen display signal, all of the test transistors are held in an OFF state.

15. A method for driving an active matrix display device having a display region consisting of sub-pixels arrayed in a matrix fashion, the sub-pixels having switching elements, the method comprising the steps of:
during a test of the display device, applying a reference signal indicating enabling test switches for the sub-pixels to control terminals of the test switches to enable the test switches so that first test signals can be applied to scan signal lines of the sub-pixels through the test switches, wherein the control terminals are coupled to common voltage lines for the sub-pixels;
when driving the display device by scan signals and data signals, applying a reference signal indicating disabling the test switches to the control terminals of the test switches to disable the test switches while the reference signal serves as a common voltage to be supplied on the common voltage lines so as to enable storage capacitance to be formed within the sub-pixels.

16. An active matrix display device having a display region consisting of sub-pixels arrayed in a matrix fashion, the sub-pixels having switching elements, comprising:
a plurality of data signal lines for sending data signals to the sub-pixels;
a plurality of scan signal lines for sending scan signals to the sub-pixels;
a plurality of common voltage lines for sending a reference voltage to the sub-pixels;
first test transistors, each of which is connected to one of the plurality of scan signal lines for sending first test signals thereto;
second test transistors, each of which is connected to one of the plurality of data signal lines for sending second test signals thereto; and
a plurality of first and second input terminals, each of the first input terminals is connected to one of a plurality of the first test transistors and each of the second input terminals is connected to one of a plurality of the second test transistors;
wherein each gate of the first test transistors and each of the common voltage lines are connected to one of the first input terminals, each gate of the second test transistors and each of the common voltage lines are connected to one of the second input terminals, the first and second test transistors control inputs of the first and second test signals to the sub-pixels.

17. An active matrix display device having a display region consisting of sub-pixels arrayed in a matrix fashion, the sub-pixels having switching elements, comprising:

a plurality of data signal lines for sending data signals to the sub-pixels;
a plurality of scan signal lines for sending scan signals to the sub-pixels;
a plurality of common voltage lines for sending a reference voltage to the sub-pixels;
test transistors, each of which is connected to one of the plurality of data signal lines for sending test signals thereto; and
a plurality of input terminals, each of which is connected to one of a plurality of the test transistors;
wherein each gate of the test transistors and each of the common voltage lines are connected to one of the input terminals, the test transistors control inputs of the test signals to the sub-pixels.

18. A display circuit comprising:
a pixel array having pixels each of said pixels coupled to a first line a second line and a third line to receive a scan signal, a data signal and a common voltage respectively; and
a plurality of test transistors having drains/sources coupled to the first lines, sources/drains coupled to receive first signals and gates commonly coupled to receive a second signal;
wherein the test transistors are turned on by the second signal so that the first signals are transmitted on the first lines to drive the pixels during a test, and the test transistors are turned off by the second signal so that the first signals are isolated from the first lines and the second signal is used as the common voltage supplied to the pixels through the third lines beyond the test.

19. The circuit as claimed in claim 18, wherein each of the pixels comprises:
a second transistor having a gate coupled to one of the first lines, a drain/source coupled to the second line; and
a storage capacitor formed between one of the third lines and a source/drain of the second transistor.

20. The circuit as claimed in claim 18 further comprising:
a data driver generating the data signals; and
a scan driver generating the scan signals.

21. A liquid crystal display panel comprising:
an array substrate on an LCD circuit is formed, wherein the LCD circuit comprises:
a pixel array having pixels each of said pixels coupled to a first line, a second line, and a third line to receive a scan signal, a data signal and a common voltage respectively, and each of the pixels has a pixel electrode; and
a plurality of test transistors having drains/sources coupled to the first lines, sources/drains coupled to receive a first signal and gates coupled to receive a second signal;
wherein the test transistors are turned on by the second signal so that the first signals are transmitted on the first lines to drive the pixels during a test, and the test transistors are turned off by the second signal so that the first signals are isolated from the first lines and the second signal is used as the common voltage supplied to the pixels through the third lines beyond the test;
a facing substrate having a common electrode; and
a liquid crystal sealed between the array and facing substrate.

22. The panel as claimed in claim 21, wherein the LCD circuit further comprises:
a data driver generating the data signals; and
a scan driver generating the scan signals.

23. The panel as claimed in claim 21, wherein each of the pixels further comprises:
a second transistor having a gate coupled to one of the first lines, a drain/source coupled to the second line; and
a storage capacitor formed between one of the third lines and a source/drain of the second transistor.

* * * * *